United States Patent
Ruckart

(10) Patent No.: US 7,197,134 B1
(45) Date of Patent: Mar. 27, 2007

(54) DTMF GENERATING ASSISTANT

(75) Inventor: John P. Ruckart, Atlanta, GA (US)

(73) Assignee: BellSouth Intellectual Property, Corp, Wilmington, DE (US)

( * ) Notice: Subject to any disclaimer, the term of this patent is extended or adjusted under 35 U.S.C. 154(b) by 710 days.

(21) Appl. No.: 09/949,587

(22) Filed: Sep. 10, 2001

(51) Int. Cl.
*H04M 1/00* (2006.01)
*H04M 3/00* (2006.01)

(52) U.S. Cl. .............. 379/357.03; 379/93.06; 379/93.37; 379/352; 379/372; 379/418; 379/419; 379/447

(58) Field of Classification Search .................. 379/357.01–357.05
See application file for complete search history.

(56) References Cited

U.S. PATENT DOCUMENTS

| | | | | |
|---|---|---|---|---|
| 4,941,172 A | * | 7/1990 | Winebaum et al. | 379/357.03 |
| 5,509,056 A | * | 4/1996 | Ericsson et al. | 379/114.15 |
| 5,539,819 A | * | 7/1996 | Sonoyama et al. | 379/357.03 |
| 5,700,037 A | * | 12/1997 | Keller | 283/107 |
| 5,748,713 A | * | 5/1998 | Kovacs, Jr. | 379/144.02 |
| 5,764,742 A | * | 6/1998 | Howard et al. | 379/114.15 |
| 5,963,637 A | * | 10/1999 | Arzoumanian | 379/357.03 |
| 2002/0188863 A1 | * | 12/2002 | Friedman | 713/201 |
| 2003/0045267 A1 | * | 3/2003 | Himmel et al. | 455/406 |

* cited by examiner

*Primary Examiner*—Fan Tsang
*Assistant Examiner*—Ramnandan Singh
(74) *Attorney, Agent, or Firm*—Withers & Keys, LLC

(57) ABSTRACT

A DTMF generating device for automatically generating DTMF tones corresponding to a predefined phone number comprises a processor, a memory, and a speaker enveloped in a credit card sized casing. The memory has stored therein DTMF tone samples corresponding to the predefined phone number. When a user presses on a portion of the casing, the DTMF tone samples are played by the speaker.

10 Claims, 3 Drawing Sheets

DTMF GENERATING ASSISTANT

FIELD OF THE INVENTION

The present invention relates generally to telephony, and more particularly, to a device operable to generate dual tone multi-frequency (DTMF) corresponding to placing a call to a predefined telephone number.

BACKGROUND OF THE INVENTION

Telephones are ubiquitous in modern society and are used by millions of people on a daily basis. Remarkably, despite the popularity of telephones, the telephone interface has remained relatively the same for decades. In order to place a telephone call, users must remember, or have access to the number they wish to call, and manually key the number into the telephone unit using a keypad. Remembering phone numbers and repeatedly manually keying these numbers without error are cumbersome, if not annoying obstacles to efficient communication. Perhaps these obstacles are best illustrated in the context of accessing calling card plans.

Calling card plans allow users of the plans to bill telephone calls made from virtually any telephone to a calling card account. Generally, in order to use a calling card plan, it is necessary to first dial the calling card plan access number. Once connected to the access number, a user enters the calling card account number followed by a personal identification number ("PIN"). Once this information has been entered, the number to which the call is being placed may be dialed.

Persons using a calling card plan must therefore remember the calling card plan access number, which is typically ten digits, the account number, which also is typically ten digits, and a PIN, which may be four or five digits. For many calling plan users, remembering all of these numbers is too demanding, especially if they infrequently use the plan. Subscribers to calling card plans, therefore, often carry a physical card with the access number and account number on it. Furthermore, subscribers often write their PIN numbers on a piece of paper or on the calling card and refer to that paper or card when making calling plan calls.

In addition to having to remember these numbers, users of calling card plans must also correctly dial the calling card plan access number, account number, and PIN. The calling card plan access number can be ten digits in length. Likewise, the account number may be ten digits. The PIN may be an additional five digits. Thus, when using a calling card plan, simply getting to the point of being able to dial the number to which the user wishes to connect requires first correctly dialing up to twenty five digits. Dialing twenty-five digits without making a mistake can be a cumbersome task. Furthermore, repeatedly dialing these twenty-five digits can become monotonous and tiresome.

Pre-paid calling platforms and voice portals similarly require users to remember and repeatedly manually dial long strings of numbers. Indeed, even connecting to seven digit and ten digit telephone numbers requires remembering the telephone numbers and correctly manually keying the numbers using a keypad. For many adults, remembering frequently dialed telephone numbers is a difficult task. Children often have a difficult time remembering even a few very important numbers such as their home phone number or their parents' work number.

Accordingly, there is a need in the art for an improved mechanism for remembering and dialing telephone numbers. This is especially true of calls placed using services such as calling cards and pre-paid calling cards, which require entry of long strings of numbers.

SUMMARY OF THE INVENTION

Briefly, the present invention meets these and other needs in the art.

According to an aspect of the invention, a DTMF generating device with a small form factor is provided that automatically upon demand generates DTMF tones corresponding to a predefined telephone number. The predefined telephone number may be any number but typically is a frequently dialed telephone number such as, for example, a calling card plan access number, account number, and PIN. A person wishing to make a telephone call can hold a DTMF generating device in accordance with the invention in close proximity to the phone receiver and have the DTMF tones necessary for dialing the call played into the receiver. A DTMF generating device in accordance with the invention thereby removes the burden of having to remember and manually key phone numbers and phone account access numbers.

Additional aspects of the invention are described in detail below.

BRIEF DESCRIPTION OF THE DRAWINGS

Other features of the invention will be further apparent from the following detailed description of presently preferred exemplary embodiments of the invention taken in conjunction with the accompanying drawings, of which.

DETAILED DESCRIPTION OF THE INVENTION

A system and method with the above-mentioned beneficial features in accordance with a presently preferred exemplary embodiment of the invention will be described below with reference to FIGS. 1–3. It will be appreciated by those of ordinary skill in the art that the description given herein with respect to those figures is for exemplary purposes only and is not intended in any way to limit the scope of the invention. All questions regarding the scope of the invention may be resolved by referring to the appended claims.

According to an aspect of the invention, there are disclosed a DTMF generating device and methods performed by the DTMF generating device to automatically generate DTMF tones corresponding to accessing a particular telephone number. The DTMF generating device can be held close to a telephone receiver and the DTMF tones corresponding to a particular telephone number broadcast from the device into the receiver so as to connect to the a calling card plan.

Figure 1:
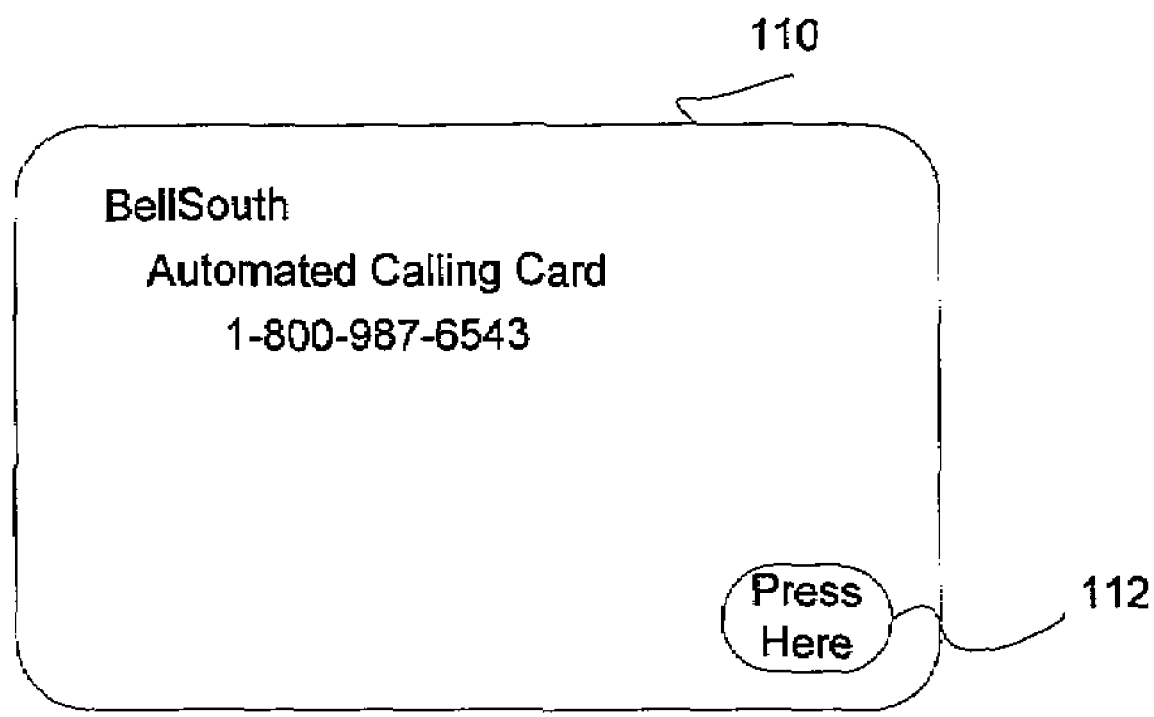
FIG. 1 is a block diagram of a DTMF generating device suitable for use in an embodiment of the present invention.

FIG. 1 is a perspective view of a DTMF generating device in accordance with an aspect of the invention. In the disclosed embodiment, DTMF generating device 110 has a form factor similar to that of a traditional business card or credit card. Indeed, in the disclosed embodiment, the length and width of exemplary DTMF generating device 110 are that of a traditional credit card. DTMF generating device 110 has a thickness slightly greater than that of a credit card so as to accommodate various electronics components, which are discussed below in connection with FIG. 2, that are enclosed within DTMF generating device 110. Those skilled in the art will recognize that DTMF generating device 110 may have a form factor other than that of a credit card. For example, DTMF generating device 110 may have the form factor of a key chain fob or a similarly sized device which is easily portable.

As shown in FIG. 1, DTMF generating device 110 has an area 112, which when pressed, causes DTMF generating device 110 to generate DTMF tones corresponding to a designated phone number or service plan such as a calling card plan. In the case that DTMF generating device 110 is designed to generate DTMF tones to connect to a calling card plan, DTMF is generated corresponding to the calling card plan access number and calling card account number. These may be broadcast into the receiver of a telephone. Thereafter, the operator may enter the PIN corresponding to the account number and the telephone number to which he wishes to connect using the telephone keypad.

Figure 2:
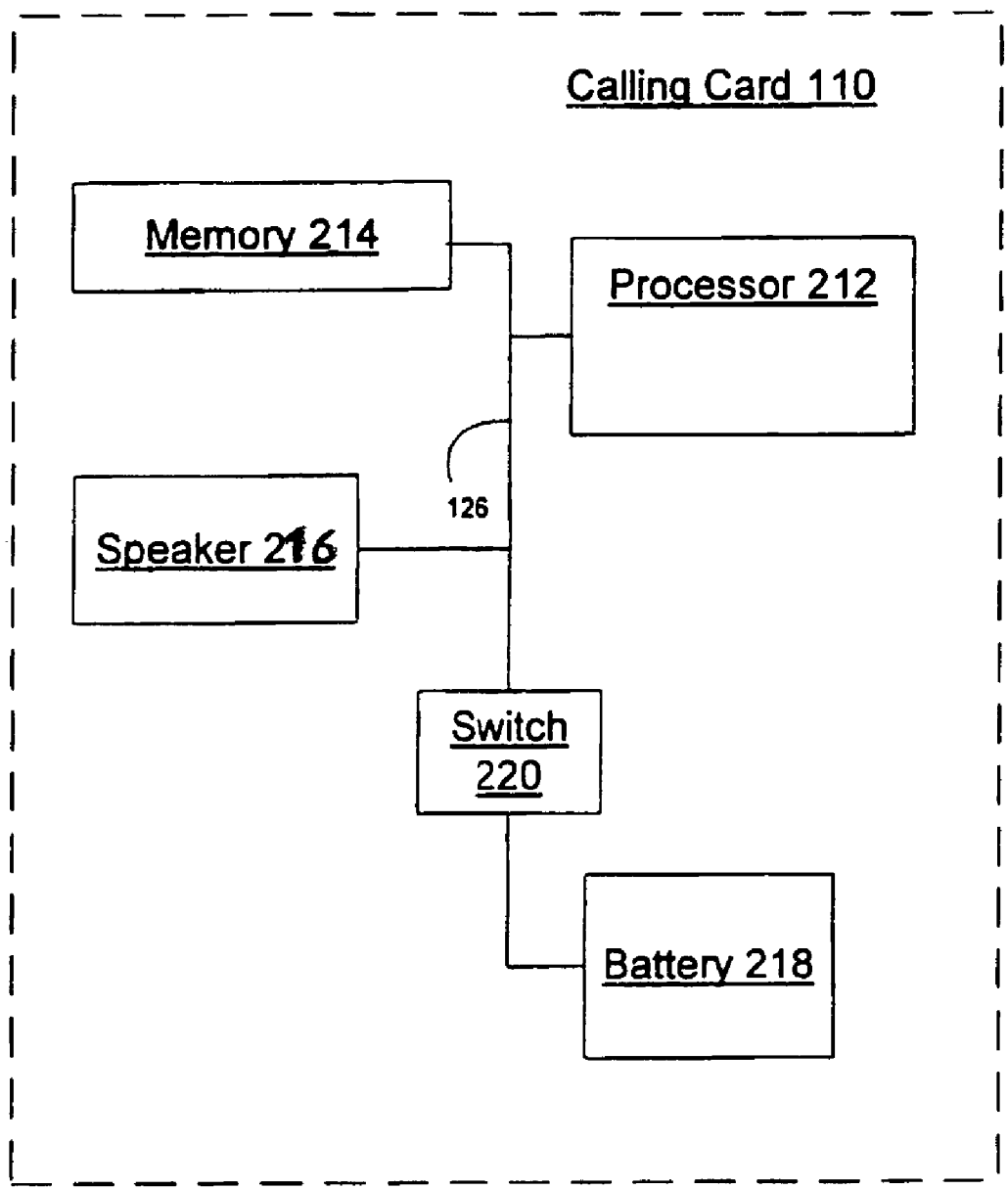
FIG. 2 is a diagram illustrating a perspective view of a DTMF generating device in accordance with an embodiment of the present invention.

FIG. 2 is a block diagram of a DTMF generating device 110 in accordance with an aspect of the invention. As shown, exemplary DTMF generating device 110 comprises processing unit 212 and memory 214. Processing unit 212 may be an application specific integrated circuit (ASIC) designed for the purpose of causing DTMF tones to be generated by speaker 216. System memory 214 might include read-only memory (ROM) and random access memory (PAM) and may be comprised within processor 212. Speaker 216 might be any type of speaker such as, for example, a piezo-electric speaker, that is capable of producing dual tone modulated frequency tones. Battery 218 supplies power to processor 212, memory 214, and speaker 216. Switch 220 controls the flow of power from battery 218 to the other components. Generally, switch 220 is in an "off" position, thereby preventing the flow of electrical power from battery 218 to the other components. However, when an operator presses on exterior area 112 of DTMF generating assistant 110 as described above in connection with FIG. 1, switch 220 becomes closed, allowing power to flow from battery 218 to components 212, 214, and 216 which results in DTMF tones being generated at speaker 216.

Figure 3:
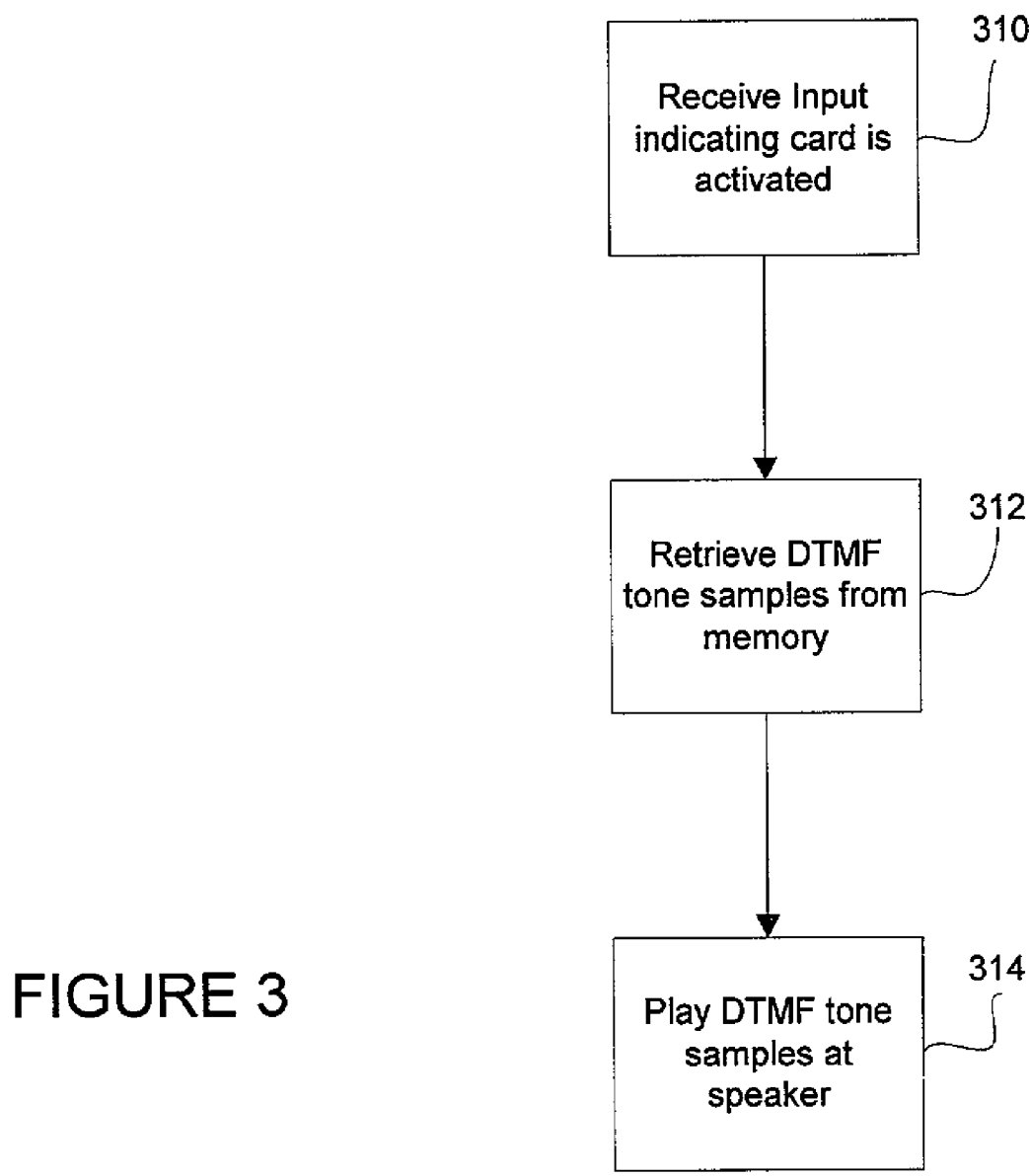
FIG. 3 is a flow diagram of a method performed by a DTMF generating device in accordance with the invention in response to activation by a user.

FIG. 3 is a flowchart of a method performed by DTMF generating device 110 for automatically generating DTMF tones corresponding to designated number. In the exemplary embodiment, the designated number is a calling card plan access number. Those skilled in the art will recognize, however, that method may be employed to generate DTMF corresponding to any designated number.

As shown, at step 310, an input is received at processor 212 indicating that DTMF generating device 110 has been activated. This signal may be received, for example, when an operator presses on exterior area 112 of DTMF generating device 110 which causes switch 220 to be placed in an "on" position.

At step 312, processor 212 retrieves DTMF tone samples from memory. The tone samples correspond to the calling card access information. Specifically, the tones correspond to a calling card access number and a calling card account number. For example, the tones may correspond to calling card access number 1.800.234.6789 and calling card account number 609.567.8904. According to an alternate embodiment, the tone samples may also comprise a PIN such as, for example, 1122.

At step 314, signals are forwarded by processor 212 to speaker 216, causing the DTMF tone samples to be generated by speaker 216. Those skilled in the art will recognize that while the DTMF tones are being generated by speaker 122, pauses are inserted where appropriate to correspond to expected delays in the calling card access process. For example, after generating the DTMF tones corresponding to the calling card access number are generated, a pause is inserted to provide time for connection to the access number.

By placing the DTMF generating device 110 in close proximity to the receiver of a telephone while the DTMF tones are generated, the telephone call can be connected and billed to a calling card plan.

Thus, there has been disclosed a DTMF generating device and methods performed by the DTMF generating device for automatically generating DTMF tones corresponding to a prescribed phone number. A DTMF generating device in accordance with the invention allows for operators to quickly and easily make telephone calls. Using a DTMF generating device in accordance with the invention, users are spared the burden of remembering telephone numbers and manually keying those numbers into a keypad.

While the invention has been described and illustrated with reference to specific embodiments, those skilled in the art will recognize that modification and variations may be made without departing from the principles of the invention as described above and set forth in the following claims. For example, the device might be designed and used to facilitate automated dialing of numbers other than a calling card plan. For example, the device may have DTMF tone samples stored therein which when played connect to a toll free business number. Likewise, the device could be given to children and produce DTMF tone samples corresponding to a home telephone number, a parent's work number, or even the police. The device may be used by persons with medical conditions such as diabetes or allergies to connect to services whereby medical and emergency instructions may be obtained. Those skilled in the art will further recognize that the DTMF generating device may have form factors other than a business or credit card such as, for example, a key chain fob or other similarly sized device. Accordingly, reference should be made to the appended claims as indicating the scope of the invention.

What is claimed is:

1. A device for automatically generating a predefined sequence of dual tone multi-frequency (DTMF) tones, comprising:
    an electronic memory having stored therein DTMF tone samples corresponding to a predefined sequence;
    a speaker operable to play said samples;
    a processor separate from the electronic memory and being in communication with the electronic memory over a data bus, the processor having stored therein instructions executable by said processor for performing the following steps:
        recognizing that the device has been activated, and
        forwarding said DTMF tone samples obtained from the electronic memory over the data bus to said speaker;
    a battery for providing electrical power to said speaker and said processor;
    a switch for controlling the flow of electrical power from said battery to said processor and said speaker, wherein the power is administered to energize the processor and the speaker to play DTMF tone samples; and
    a key chain fob for enveloping said battery, said switch, said memory, said speaker, and said processor, wherein said key chain fob is in direct contact with said switch such that said switch is changed from a non-conducting state to a conducting state when pressure is applied to the key chain fob.

2. The device of claim 1, wherein said DTMF tone samples corresponding to a predefined sequence correspond to a calling card access number and a calling card account number.

3. A device for automatically generating dual tone multi-frequency (DTMF) tones corresponding to a predefined telephone number, comprising:

an electronic memory having stored therein DTMF tone samples corresponding to the predefined telephone number;

a speaker operable to play said samples;

a processor separate from the electronic memory and being in communication with the electronic memory over a data bus, the processor having stored therein instructions executable by said processor for performing the following steps:

recognizing that the device has been activated;

forwarding said DTMF tone samples obtained from the electronic memory over the data bus to said speaker;

a battery for providing electrical power to said speaker and said processor;

a switch for controlling the flow of electrical power from said battery to said processor and said speaker, wherein the power is administered to energize the processor and the speaker to play DTMF tone samples; and a key chain fob enveloping said battery, said switch, said memory, said speaker, and said processor, wherein said key fob is in direct contact with said switch such that said switch is changed from a non-conducting state to a conducting state when pressure is applied to the key chain fob.

4. The device of claim 3, wherein the predefined telephone number is the number for accessing a calling card plan.

5. A method for automatically generating dual tone multi-frequency (DTMF) tones corresponding to a predefined sequence comprising:

receiving input when an exterior area of a key chain fob is pressed, the key chain fob being in direct contact with a switch such that the switch is changed from a non-conducting state to a conducting state when pressure is applied to the key chain fob, the input indicating that a DTMF generating device has been activated and controlling the flow of electrical power from a battery to a processor and a speaker, wherein the power is administered to energize the processor and the speaker to play DTMF tone samples;

retrieving from an electronic memory via a data bus interconnecting the processor to the electronic memory DTMF tone samples corresponding to the predefined sequence; and forwarding the DTMF tone samples to the speaker operable to play the samples.

6. The method of claim 5, wherein retrieving from an electronic memory DTMF tone samples corresponding to the predefined sequence comprises retrieving from the electronic memory DTMF tone samples corresponding to a number for accessing a calling card plan.

7. The method of claim 5, wherein retrieving from an electronic memory DTMF tone samples corresponding to the predefined sequence comprises retrieving from the electronic memory DTMF tone samples corresponding to a personal identification number.

8. The method of claim 5, further comprising playing the DTMF tone samples at the speaker.

9. The method of claim 8, further comprising inserting a pause in the playing of the DTMF tone samples to correspond to an expected delay in the calling card access process.

10. A computer readable medium having computer executable instructions for performing the steps recited in claim 5.

* * * * *